United States Patent [19]

Hansman

[11] 3,857,380

[45] Dec. 31, 1974

[54] BARBECUE GRILL

[76] Inventor: John E. Hansman, 660 Belmont Ln., St. Paul, Minn. 55102

[22] Filed: Aug. 27, 1973

[21] Appl. No.: 391,948

Related U.S. Application Data

[63] Continuation-in-part of Ser. No. 165,135, July 22, 1971.

[52] U.S. Cl. ................................................ 126/25 A

[51] Int. Cl. ........................... A47j 37/07, F24b 3/00

[58] Field of Search ...... 126/25 B, 25 A, 25 R, 9 R; 110/1 F

[56] References Cited

UNITED STATES PATENTS

| | | | |
|---|---|---|---|
| 2,161,669 | 6/1939 | Freeman | 126/25 R |
| 2,638,888 | 5/1953 | Molla | 126/25 A |
| 2,806,463 | 9/1957 | Smith | 126/25 A |
| 3,306,280 | 2/1967 | Vannoy | 126/25 R |
| 3,489,132 | 1/1970 | West | 126/9 R |
| 3,491,744 | 1/1970 | Kohorn et al. | 126/25 R |
| 3,667,446 | 6/1972 | Morton | 126/9 R |

*Primary Examiner*—Carroll B. Dority, Jr.
*Assistant Examiner*—Harold Joyce

[57] ABSTRACT

A paper and charcoal burning barbecue grill having vertically extending lower and upper burning compartments which are separated by a movable horizontal grate member. The lower burning compartment is suitable for receiving crumpled paper which, upon ignition, provides heat for quick broiling or roasting and for igniting the charcoal positioned on the top surface of the grate member. The grill has insulated-wall construction and provides an air passageway for ventilating the burning compartments so as to provide uniform combustion of both the paper and the charcoal. Drawer means are provided for emptying ash from the barbecue grill.

2 Claims, 7 Drawing Figures

95b
40
80
10
13
13a
20
14a
14
34b
95a
50
70
71a
61
56
57
60b
17

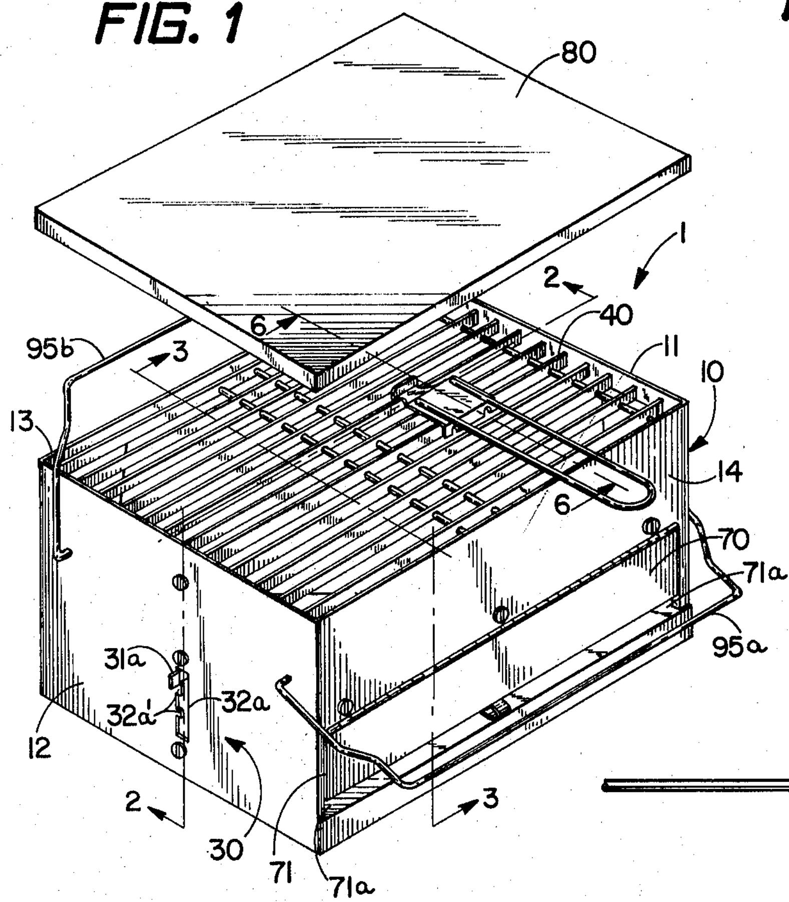
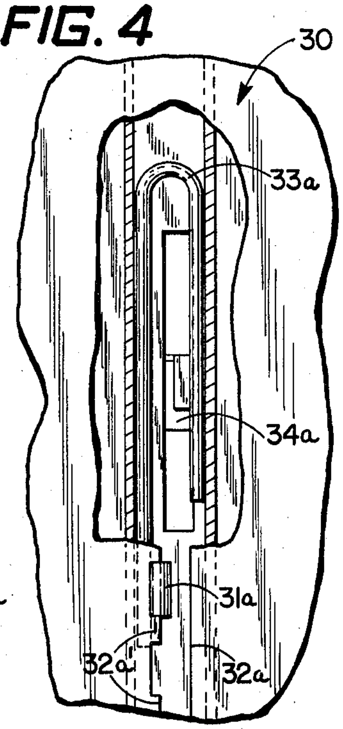
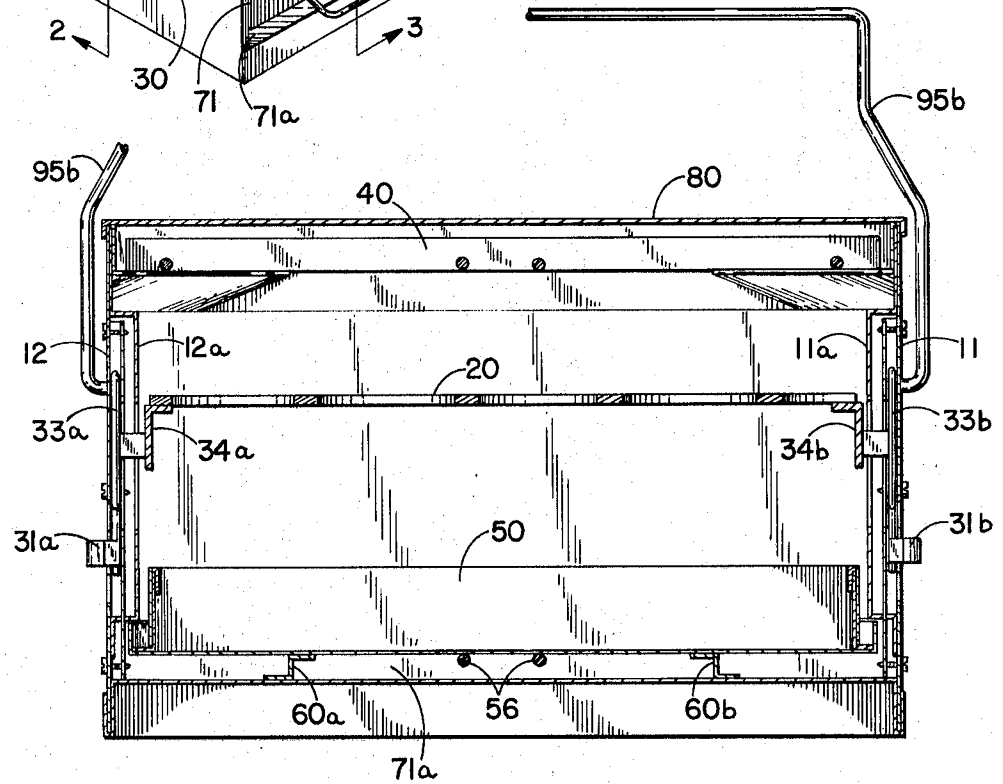
FIG. 2

95b
40
80
10
13
13a
20
14a
14
34b
95a
50
70
71a
61
56
57
60b
17

90
91
92
40

51c
51
51a
52a
52
56
51b
51d
50

20

BARBECUE GRILL

CROSS-REFERENCE TO RELATED APPLICATION

The present Application is a continuation in part of my co-pending Application Ser. No. 165,135 filed July 22, 1971.

BACKGROUND OF THE INVENTION

1. Field of the Invention

The present invention pertains to barbecue grill apparatus suitable for burning both a readily combustible material such as paper and a charcoal-like fuel.

2. Discussion of the Prior Art

Numerous different designs of barbecue grills utilizing charcoal as the fuel element (or other similar fuel materials) are commercially available. One disadvantage of some of these designs is the difficulty the user frequently experiences in igniting the charcoal and obtaining a uniform temperature. Various techniques and devices, e.g., starter fuels and electrical heating irons are available for facilitating the ignition of the charcoal; of these, one of the most attractivee, from the standpoint of convenience and commercial acceptance is the use of ordinary waste paper as a starter fuel. Waste paper is economical to use and burns rapidly with a relatively hot flame, if properly used. In fact, paper alone can be used as a fuel for cooking (see, for example, U.S. Pat. No. 3,581,731). However, due to the popularity of charcoal, paper is not likely to replace charcoal for barbecuing; furthermore, paper alone may be consumed too rapidly, necessitating recharging or refueling of the grill to obtain a fully and evenly barbecued food product.

Several problems are encountered when one attempts to use paper as a starter fuel for charcoal. Even if the paper is burned with an adequate draft or air supply, it leaves behind a substantial amount of ash to be disposed of. The hot flame from the burning paper can contribute to warpage or corrosion of a thin-walled metallic firebox housing or other metallic cooking equipment associated with the housing. Obtaining rapid and evenly distributed ignition of a large bed of charcoal briquettes with paper starter fuel is not straightforward.

It appears that the pattern of air flow through the burning paper and up to the charcoal bed can significantly affect the speed with which the charcoal can be ignited and the distribution of heat of ignition through the charcoal bed.

Accordingly, this invention seeks to provide a barbecue grill which is light in weight, readily transportable, safe to use, durable, and relatively maintenance free, but which is designed for rapid and evenly distributed ignition of a charcoal bed with a paper-like starting fuel (e.g., waste newspaper), and which has good corrosion resistance and good resistance to temperature-induced deformation of rod- or sheet-like members or elements or walls or the firebox of the grill.

BRIEF DESCRIPTION OF THE DRAWINGS

FIG. 1 is a perspective view of the present barbecue grill apparatus;

FIG. 2 is a cross-sectional view taken along the line 2—2 of FIG. 1;

FIG. 4 is an enlarged view of a portion of FIG. 1 with parts broken away to show the construction of a grate-supporting mechanism element;

DETAILED DESCRIPTION OF THE PREFERRED EMBODIMENT

Figure 3:
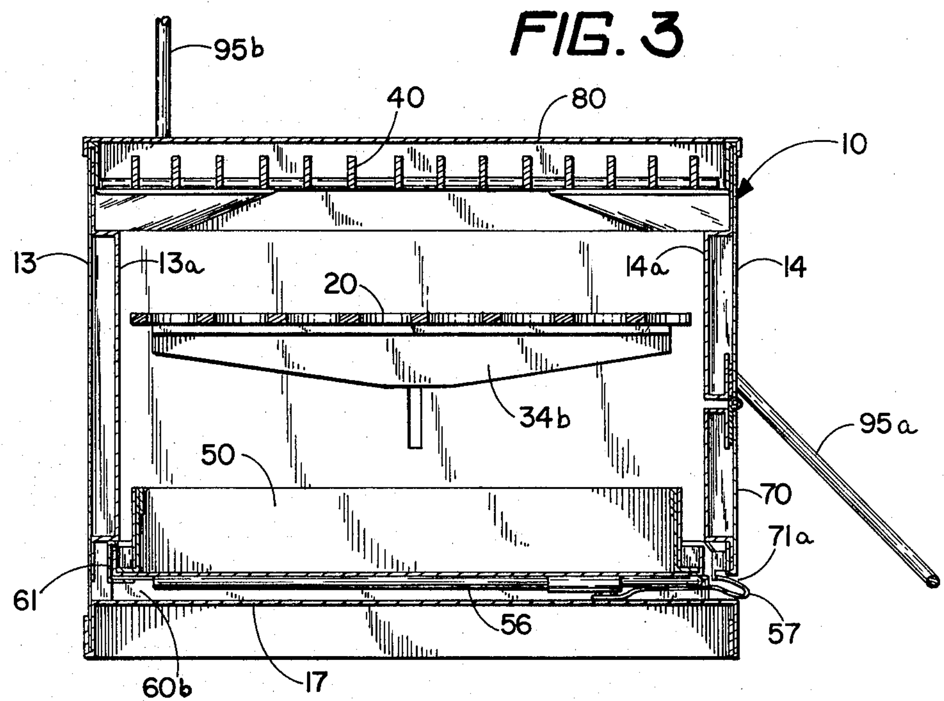
FIG. 3 is a cross-sectional view taken along the line 3—3 of FIG. 1.
Figure 6:
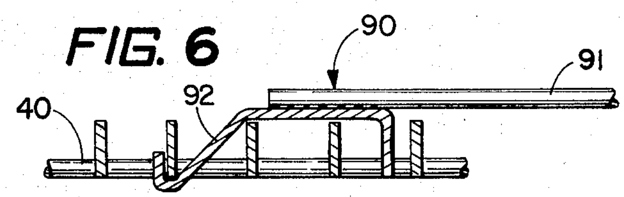
FIG. 6 is a side elevational view of the broiling grill handle.
Figure 5:
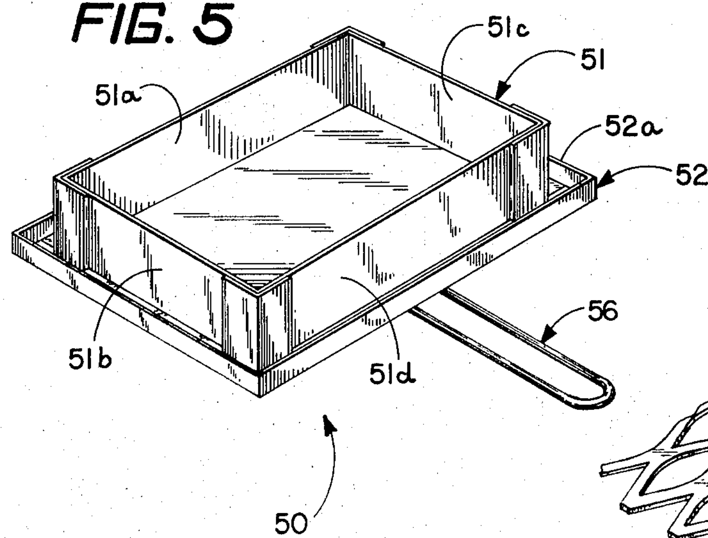
FIG. 5 is a perspective view of an ash drawer element of the barbecue grill apparatus.

Referring now to the Figures, wherein like numerals refer to like structural elements, FIG. 1 shows the preferred embodiment of the portable barbecue grill 1. The barbecue grill 1 comprises a rectangular firebox housing 10 which supports a broiling grill 40 and which can be enclosed by a cover 80. Housing 10 has two outside sidewalls 11 and 12, a back outside wall 13 and a front outside wall 14. In the embodiment shown in FIG. 1, walls 11 – 14 are constructed of sheet metal. Interior walls **11*a*, 12*a*, 13*a*, and 14*a* are displaced from walls 11, 12, 13 and 14 respectively with the space between the interior and exterior walls enclosed to form hollow insulative walls. The use of hollow walls makes the grill safer and easier to handle. In addition, the insulated wall prevents warpage which may occur in the heating of a single thin metal wall. A bottom panel 17 forms the base of the firebox 10** and it will be described in detail later.

Figure 7:
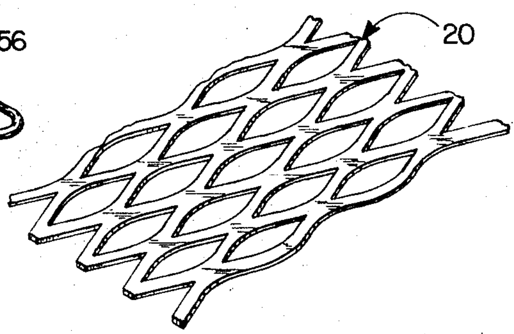
FIG. 7 is a fragmentary perspective view of the charcoal grate element of the barbecue grill apparatus.

A grate 20 is movable supported within the interior of firebox 10 by means of a movable grate support mechanism 30 to be described in detail later (see FIG. 4). Grate member 20 is intended to support charcoal or whatever other fuel is used to heat food placed upon broiling grill 40. FIG. 7 shows a lattice-like design for grate 20 but other suitable designs may also be used. Grate 20 divides the interior of firebox 10 into an upper and a lower compartment or burning chamber. The upper compartment above grate 20 houses the charcoal and the lower compartment between grate 20 and bottom panel 17 is intended to hold crumpled waste paper or other fast-burning solid fuel high in cellulose and relatively low in ash content. The purpose of the waste paper (e.g., newspaper) or similar fuel is twofold. It can be used as the sole fuel for the barbecue grill 1 or, preferably, it can be used as a means for igniting the charcoal which is contained on grate 20. In the latter configuration where the paper in the lower chamber above bottom panel 17 is used merely to ignite the charcoal lying on grate 20, the inventor has found that several pieces of crumpled up newspaper are sufficient to start the charcoal on grate 20 burning in a matter of minutes (e.g., 5 – 10 minutes). This eliminates the need for other charcoal starters such as electrical irons or chemicals. The use of electrical irons and chemicals have disadvantages in that chemicals can impart an unpleasant odor or taste to the food contained on the broiling grill 40 and often times electrical outlets are not available for the use of electrical heating irons. In addition, newspaper and the like is frequently available and is a relatively inexpensive means for starting a charcoal fire.

Charcoal grate 20 can be moved to various heights within firebox 10 by means of grate support mechanism 30. This height variation is desirable in that it allows the spacing below grate 20 to be increased to accommodate more paper in the lower compartment of firebox 10 and it also allows grate 20 to be moved closer to broiling grill 40 so that the source of heat on grate 20 may be moved closer to the food being prepared.

Referring to the movable grate support mechanism 30 shown in FIG. 4, indexing tabs 31*a* and 31*b* are provided which are movable in positioning slots 32*a* and 32*b* located in firebox walls 12 and 11 respectively. The positioning slots 32*a-b* have an uneven vertical side with a contour which defines a series of teeth 32*a'* and 32*b'* respectively. Tabs 31*a* and 31*b* can be selectively positioned in slots 32*a* and 32*b* by resting them upon any of the protruding teeth 32*a'* and 32*b'* respectively. As is also shown in FIG. 4, indexing tabs 31*a* and 31*b* are attached to U-shaped slide members 33*a* and 33*b* which are contained between the interior and exterior walls 12 and 12*a* and 14 and 14*a* respectively. Attached to slide members 33*a* and 33*b* are support members 34*a* and 34*b* respectively. Support members 34*a* and 34*b* extend into the interior portion of firebox 10 and provide a flat surface upon which grate 20 can be rested (see FIGS. 2, 3, and 4). Grate 20 can be lifted from supports 34*a* and 34*b* when it is desired to disassemble the grill for cleaning and the like. The U-shaped slide members 33*a* and 33*b* are constructed from heavy gauge wire and have a spring-loading effect upon the setting of tabs 31*a* and 31*b*.

In the embodiment shown in FIGS. 1, 2 and 3 an opening 71 is provided in the front wall 14 of firebox 10. A hinged door 70 extends over the top portion of opening 71 leaving a continually open vent 71*a* defined by bottom panel 17 and the lower edge of door 70. Opening 71 in combination with door 70 has a twofold purpose. First, door 70 can be raised and an ash drawer 50 can be inserted through opening 71 into the bottom portion of firebox 10. When hinged door 70 is lowered to its closed position, only a small portion of the opening 71, i.e., vent 71*a*, is left open. It is the function of this continually open vent 71*a* to serve as an air inlet means for the lower burning chamber of firebox 10 to aid in combustion of the material to be burned in barbecue 1. In the preferred embodiment of FIGS. 1 and 3, vent 71*a* is a relatively narrow slot that extends across nearly the entire width of front wall 14 of firebox 10. It is the purpose of vent 71*a* to provide air flow through a channel system which will be described in detail later.

Ash drawer 50 comprises a generally rectangular tray 51 (made up of walls 51*a* – 51*d*) attached to a platform 52 which has an upturned edge 52*a*. Platform 52 also serves as the bottom panel of tray 51. When ash drawer 50 is inserted through opening 71 into firebox 10, tray 51 can be used to contain crumpled up paper and the like for igniting the charcoal on grate 20. Ash resulting from the burning of paper or charcoal collects in tray 51 and is contained therein until it is removed from firebox 10. Because ash drawer 50 is below grate 20 and easily removable through opening 71, ash drawer 50 can be removed and emptied at any time, even when the grill 1 is being used. Ash drawer 50 is supported upon two rails 60*a* and 60*b* which are attached to a bottom panel 17 of firebox 10 and which extend longitudinally from the front to the back of firebox 10 such that when ash drawer 50 is inserted in firebox 10, a space is defined between bottom panel 14 of firebox 10 and platform 52. This open space is in register with vent 71*a* and is part of a ventilating passageway which will be described in detail later. As is shown in the preferred embodiment of FIGS. 2 and 3, bottom panel 17 of firebox 10 upon which the support rails 60*a* and 60*b* are supported is elevated above the bottom edge of firebox walls 11–14 to prevent heat from being transferred from bottom panel 17 to the surface upon which barbecue grill 1 is resting.

To provide proper ventilation to the interior of firebox 10 both at the lower portion adjacent to ash drawer 50 and to the upper portion above charcoal grate 20, a plurality of passageways are defined by the structural elements of barbecue grill 1. As was noted earlier, an open space is defined between bottom panel 17 of firebox 10 and platform 52 of ash drawer 50. This open space communicates with the continually open vent 71*a* in front wall 14. Thus, air continually flows through vent 71*a* from the outside of firebox 10 into the area between the firebox bottom panel 17 and the platform 52 of ash drawer 50. Similarly, the use of support rails 60*a* and 60*b* to support ash drawer 50 is also intended to channel air through firebox 10. In particular, because support rails 60*a* and 60*b* extend from the front to the rear of firebox 10, air which enters between rails 60*a* and 60*b* through vent 71*a* cannot be drawn up the sidewalls 12*a* and 11*a* of firebox 10, but must instead flow to the back of firebox 10 and be drawn up the interior back surface 13*a*. This insures that an adequate flow of air extends to the back of firebox 10 as well as to the sides and front of firebox 10.

The contour of the ash drawer 50 forms a part of the air flow or draft directing system of this invention. This air flow system can be best understood by referring to FIGS. 2, 3, and 4. Air entering through vent 71*a* can flow into the portion of the lower burning chamber between grate 20 and platform 52, but due to the baffling effect of upturned edge 52*a* of platform 52 and wall 51*d* of tray 51, it is just as easy (if not easier) for air to flow under platform 52, where it is guided or channelled by rails 60*a* and 60*b* and distributed in a controlled manner around the periphery (and especially at the back) of platform 52. As a result, the single vent 71*a* can supply an even flow of air to the entire lower burning chamber, and additional vents, though permissable, are not necessary. In the preferred embodiment of the invention, it is desirable that vent 71*a* be wider than the space between rails 60*a* and 60*b* and be in register with the space between platform 52 and bottom panel 17. In any event, the air flow system is designed to prevent an excessive chimney effect in the front of the grill which would draw too much air up front wall 14*a* and not enough air into other parts of firebox 10.

Upturned edge 52*a* of platform 52 of ash drawer 50 helps to retain any ash or fat droppings that collect in between tray 51 and the periphery of platform 52. It is permissable to eliminate tray 51, whereby upturned edge 52*a* retains all ash and fat droppings, but this design is not preferred for several reasons. First, upturned edge 52*a* is not high enough to retain a mass of burned paper ash while the ash drawer 50 is being removed. Second, tray 51 helps to rigidify ash drawer 50 and protect against warpage. In an alternative embodiment of the invention (not shown), upturned edge 52*a* is higher than shown in the Drawing and is constructed in a manner similar to tray 51 so as to better reinforce ash drawer 50 and eliminate the need for tray 51. This embodiment requires that the double wall construction of firebox 10 (14/14*a*, 13/13*a*, etc.) be modified to provide a larger recess between the periphery of bottom panel 17 and the point at which the double wall construction begins.

The even flow of air underneath and upwardly around ash drawer 50 helps to insure rapid and complete ignition of a bed of charcoal fuel supported by grate 20, even at the corners and outer edges of the bed and even when the bed of charcoal contains considerable empty space (e.g., when the bed is made up of scattered or spaced briquettes).

To properly position ash drawer 50 after inserting it into the lower burning chamber of firebox 10, a keeper means 61 (FIG. 3) on the back end of each of the support rails 60*a* and 60*b* abuts and fits over the upturned edge 52*a* of platform 52, thereby preventing platform 52 from contacting wall 13 and closing off the air flow in back of firebox 10 and from tilting upwardly or assuming some other skewed position.

Operation of the Invention

The operation of barbecue grill 1 can be summarized as follows. To start the charcoal burning, crumpled up paper is placed in the tray 51 of ash drawer 50. The inventor has found that four to eight sheets of newspaper crumpled into compacted wads and placed at least in the corners of drawer 50 are sufficient. Drawer 50 is inserted into firebox 10 through opening 71 and door 70 is closed. The continuously open vent 71*a* channels air beneath ash drawer 50 to evenly ventilate all portions of firebox 10 while drawer 50 is in place. To fuel barbecue grill 1, the broiling grill 40 is removed and a bed of charcoal is spread uniformly over grate 20. A single layer of charcoal is sufficient, but more layers may be added. Using a single layer of charcoal and the amount of crumpled paper mentioned, the bed of charcoal (even at the corners) is ordinarily burning vigorously in about five to ten minutes. Although it is not a preferred method of use, barbecue grill 1 can also be fueled by paper alone, wherein grate 20 is removed and the grill is stoked with paper in a manner similar to that disclosed by W. M. Schulze (U.S. Pat. No. 3,581,731).

After firebox 10 has been fueled, and the fire started, broiling grill 40 is replaced on the grill 1 using broiling grill handle 90. The charcoal bed in grate 20 can be moved toward or away from broiling grill 40 by moving indexing tabs 31*a* and 31*b* into suitable positions in positioning slots 32*a* and 32*b* respectively. Normally, it will be desirable to move the charcoal bed away from broiling grill 40 as the cooking of, for example, steaks progresses. If it is desired that additional fuel be added to firebox 10, broiling grill 40 can be easily and safely removed by removable grill handle 90 and the fuel added. Where it becomes necessary to remove accumulated ash during the grilling operation, ash drawer 50 is merely removed from firebox 10 and emptied.

To cover firebox 10 when grill 1 is not in use (or if intensified heat distribution over grill 40 is desired) removable cover 80 is placed over grill 40. Handles 95*a* and 95*b* are provided to transport grill 1 and drop to the sides of firebox 10 when not in use.

What is claimed is:

1. A barbecue grill, comprising:

a. A generally rectangular firebox, open at the top, comprising sheet metal vertically extending sidewalls and a bottom panel integral with said sidewalls; a top-mounted, upwardly openable door for partially closing off an elongated opening in one of said sidewalls and for defining a slot-like vent means, said vent means being continuously open at all times during operation of said barbecue and being defined by the bottom edge of said door and said bottom panel; each of said sidewalls and said door comprising spaced apart sheet metal panels shaped to enclose a hollow space therebetween extending from a point spaced above said bottom panel to the top of said firebox;

b. A removable grate member for supporting charcoal fuel removably supported within said firebox housing in spaced apart relation from said bottom panel and the top of said firebox; said bottom panel, sidewall means and grate member defining a lower burning chamber for receiving a paper-like solid starter fuel material;

c. An adjustable grate support mechanism for adjusting the position of said grate member upwardly or downwardly, including (1) position adjustment means mounted within the hollow spaces of said sidewalls, (2) adjustable support members integral with said position adjustment means, projecting into the interior of said firebox, for removably supporting said grate member, and (3) an adjusting tab, also integral with said position adjustment means, said adjusting tab extending out from the side walls for facilitating manual adjustment of said position adjustment means;

d. a removable broiling grill member, supported in closely spaced relation to the open top of said firebox and in spaced apart relation from said grate member;

e. a removable ash drawer, supported within said lower burning chamber and above the bottom edge of said slot-like vent means but in spaced apart relation from said grate member, comprising a generally rectangular platform having an upturned retaining edge around the periphery thereof defining an air flow directing surface;

f. drawer support means, resting on said bottom panel, for supporting said ash drawer means in spaced apart relation above said bottom panel, for defining a space below the platform of said ash drawer which is in communication with said slot-like vent means, and for directing a flow of air under said platform toward the sidewall of said firebox opposite said slot-like vent means.

2. A barbecue grill, comprising:

a. A firebox, open at the top, comprising sheet metal vertically extending sidewalls and a bottom panel integral with said sidewalls; a door for partially closing off an elongated opening in one of said sidewalls and for defining a slot-like vent means; each of said sidewalls and said door comprising spaced apart sheet metal panels shaped to enclose a hollow space therebetween extending from a point spaced above said bottom panel to the top of said firebox;

b A grate member for supporting charcoal fuel and supported within said firebox housing in spaced apart relation from said bottom panel and the top of said firebox; said bottom panel, sidewall means and grate member defining a lower burning chamber for receiving a paper-like solid starter fuel material;

c. An adjustable grate support mechanism for adjusting the position of said grate member upwardly or downwardly, including (1) position adjustment means, (2) adjustable support members integral with said position adjustment means for supporting said grate member within said firebox, and (3) an adjusting tab for facilitating manual adjustment of said position adjustment means;

d. A broiling grill member, supported in closely spaced relation to the open top of said firebox and in spaced apart relation from said grate member;

e. A removable ash drawer, supported within said lower burning chamber and above the bottom edge of said slotlike vent means but in spaced apart relation from said grate member; and f. Drawer support means, resting on said bottom panel, for supporting said ash drawer means in spaced apart relation above said bottom panel.

* * * * *